(12) United States Patent
Assius

(10) Patent No.: US 8,726,797 B2
(45) Date of Patent: May 20, 2014

(54) METHOD, APPARATUS AND SYSTEM FOR PREPARING SANDWICHES

(75) Inventor: Yannick Assius, Fuveau (FR)

(73) Assignee: Orequip, Bouc Bel Air (FR)

( * ) Notice: Subject to any disclaimer, the term of this patent is extended or adjusted under 35 U.S.C. 154(b) by 1226 days.

(21) Appl. No.: 12/293,731

(22) PCT Filed: Jan. 17, 2008

(86) PCT No.: PCT/FR2008/000062
§ 371 (c)(1),
(2), (4) Date: Mar. 23, 2010

(87) PCT Pub. No.: WO2008/107548
PCT Pub. Date: Sep. 12, 2008

(65) Prior Publication Data
US 2010/0189854 A1   Jul. 29, 2010

(30) Foreign Application Priority Data
Jan. 19, 2007  (FR) ..................................... 07 00379

(51) Int. Cl.
*A21C 15/00*   (2006.01)

(52) U.S. Cl.
USPC ........... 99/450.4; 99/450.5; 426/274; 426/275

(58) Field of Classification Search
USPC ...................... 99/450.4, 450.5; 426/274, 275
See application file for complete search history.

(56) References Cited

U.S. PATENT DOCUMENTS

| 4,963,377 | A |   | 10/1990 | Rimmeir |
|-----------|---|---|---------|---------|
| 5,865,889 | A | * | 2/1999  | Birtalan et al. .................. 118/13 |
| 6,407,850 | B1 | * | 6/2002 | Rojo et al. ..................... 359/290 |
| 6,575,337 | B1 | * | 6/2003 | Malavear ....................... 222/166 |
| 7,975,642 | B2 | * | 7/2011 | Rudesill et al. .................. 118/13 |

FOREIGN PATENT DOCUMENTS

| FR | 2 659 942     | 9/1991  |
| FR | 2 675 036     | 10/1992 |
| FR | 2 858 200     | 2/2005  |
| JP | 6-179083      | 6/1994  |
| WO | 2006/068864 A2 | 6/2006 |

* cited by examiner

*Primary Examiner* — Lien T Tran
(74) *Attorney, Agent, or Firm* — Ladas & Parry

(57) ABSTRACT

According to the invention, in a method of preparing a sandwich by introducing a filling between two mutually-facing portions of a piece of bread, the following operations are performed: placing a filling on a filling support dish; placing the dish with the filling on a tilting dish support fitted with a pusher or a handle; engaging the top and bottom portions of the piece of bread or dough product on either side of the pivot axis of the dish support; actuating the pusher or the handle to cause the dish support to tilt together with the dish towards a space for filling as defined by said top and bottom portions of the piece of bread or dough product so as to obtain an angle of inclination for the dish that is suitable for causing the filling to slide off the dish into the space for filling, while retaining the dish on the dish support.

17 Claims, 2 Drawing Sheets

METHOD, APPARATUS AND SYSTEM FOR PREPARING SANDWICHES

The present invention relates to a method of preparing sandwiches, and also to a device and a system designed to implement the method.

A particular object of the invention is to propose such methods, devices, and systems that makes it possible to make sandwiches quickly and individually, by putting a filling into the sandwich.

In the meaning of the present application, the term "sandwich" should be understood broadly so as to include in particular rolled sandwiches (or "wraps") and crepes; the invention applies more particularly to sandwiches having a non-uniform filling generally comprising a pile of "solid" pieces of food of various kinds, such as vegetables or meats, with the filling being "pinched" in or surrounded by two portions of (cooked) bread or dough product—also referred to as slices—that are connected/hinged together.

It is advantageous to be able to make sandwiches available that are prepared very quickly and "on demand": as well as enabling a consumer to select the composition of the filling and/or the variety of bread (or other dough product), Since this makes it possible in particular to avoid the dough product/bread having time to become softened by moisture from the ingredients making up the filling.

Preparing a filling and putting it into the bread "on demand" requires a considerable length of time when done manually, particularly when the filling does not comprise only a single piece (such as one sausage) and/or has the composition of a paste.

Proposals are made in patent FR-2 675 036 to place the ingredients making up the filling on a support that has a handle, to insert the support carrying the filling between two slices of bread, and then to extract the support from the sandwich.

Patent FR-2 659 942 describes a system of automatically preparing sandwiches from packaged fillings; the package of a filling is made up of a trough-shaped chute that is secured to one or more films. To prepare a sandwich, a support for a piece of bread is tilted so as to align it with a package containing the filling, the package is inserted into the bread, one end of the package is torn open, and the package is removed while being pressed so as to keep the filling in the bread.

Those sandwich filling systems and those supports/packages for filling present shapes and structures that are complex, they are difficult to embody, and they are expensive.

An object of the invention is to propose such methods, devices, and systems for preparing sandwiches, and filling supports, that are improved and/or that remedy at least in part the shortcomings or drawbacks of previously-known methods and devices.

In one aspect of the invention, there is provided a method of preparing a sandwich by inserting a filling between two (mutually-facing) portions of a piece of bread (or other dough product), which method comprises:

placing filling elements on a filling support—also referred to as a dish, a blade, or a flat—, placing the support carrying the filling on a tilting dish support secured to a pusher or a handle;

engaging the bottom and top portions of the piece of bread on either side of the dish support, respectively substantially below it and above it, and actuating the pusher to cause the dish support to tilt together with the dish it is supporting towards a space for filling that is defined by the bottom and top portions of the piece of bread, tilting continuing until an angle of inclination is obtained for the filling support that is suitable for causing the filling to slide off the filling support into the space for filling, while retaining the filling support against the dish support, and once the filling has thus been transferred into the space for filling:

keeping the dish support in place and taking the filled sandwich away from the dish support and the filling support.

In another aspect, the invention provides a sandwich filler device that comprises a base and a dish support mounted to pivot on the base between a substantially horizontal position and a position in which it is inclined relative to the horizontal, e.g. a substantially vertical position; the dish support being arranged to receive the filling support and including retaining means for retaining the filling support against the dish support when tilted; the device further including a pusher secured to the pivoting dish support.

In preferred embodiments of the invention:

the pivot/tilt axis of the dish support is substantially horizontal; and although the retaining means can act by a mechanical effect (e.g. in the form of an abutment, in particular), and/or by a pneumatic effect (e.g. in the form of a suction cup, in particular), it is particularly advantageous for these retaining means to act, at least in part, by a magnetic effect; for this purpose, the dish support may include a magnet arranged to co-operate with (attract) a magnetic element of the filling support when the filling support is placed on the dish support.

In yet another aspect, there is provided a sandwich filling support that is constituted essentially by a section member of magnetic material, preferably a ferritic stainless steel having about 17% chromium.

Such supports are easily cleaned and reused.

In preferred embodiments:

the section member comprises a plane web, where appropriate of elongate shape and extended by two longitudinal rims that slope relative to the web, in order to retain the filling piled on the web of the dish and in order to make it easier to take hold of the filled support; and the top face of the section member is covered in a layer of a material that encourages sliding of the ingredients of the filling, such as polytetrafluoroethylene (PTFE).

The invention is particularly applicable to filling an elongate piece of bread that has been split longitudinally, or a folded piece of dough product.

Other aspects, characteristics, and advantages of the invention appear from the following description given with reference to the accompanying drawings that show, without any limiting character, preferred embodiments of the invention.

Figure 1:
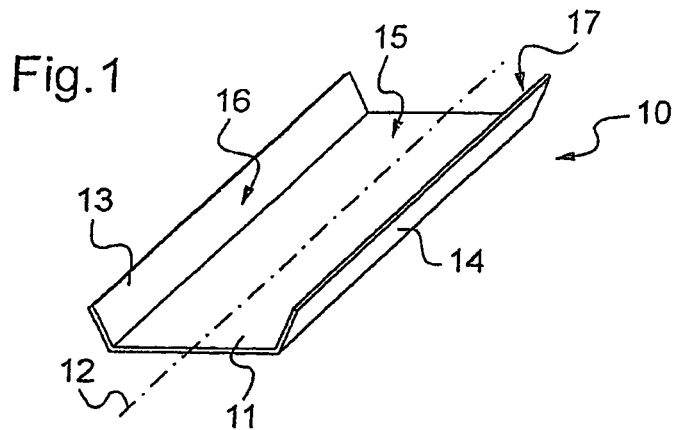
FIG. 1 is a diagrammatic perspective view of a filling support in accordance with the invention.

With reference to FIG. 1 in particular, a filling support 10 is constituted by a section member made of stainless steel containing about 17% chromium and having a cross-section of generally upwardly-flaring V-shape: the support 10 comprises a plane rectangular web 11 that is elongate along a longitudinal axis 12, together with two flanges 13, 14 projecting from the web along its two long parallel edges; the support may be obtained by cutting and folding a metal sheet; the respective faces 15 to 17 of the web 11 and of the rims 13, 14 that face upwards and that are to come into contact with the ingredients of a filling placed on the support may be covered in Teflon®.

The shape and the dimensions of the support 10 are adapted respectively to the shape and the dimensions of the sandwich that is to be filled; in a variant that is not shown, the filling support dish may in particular be disk-shaped and without any rims.

Figure 2:
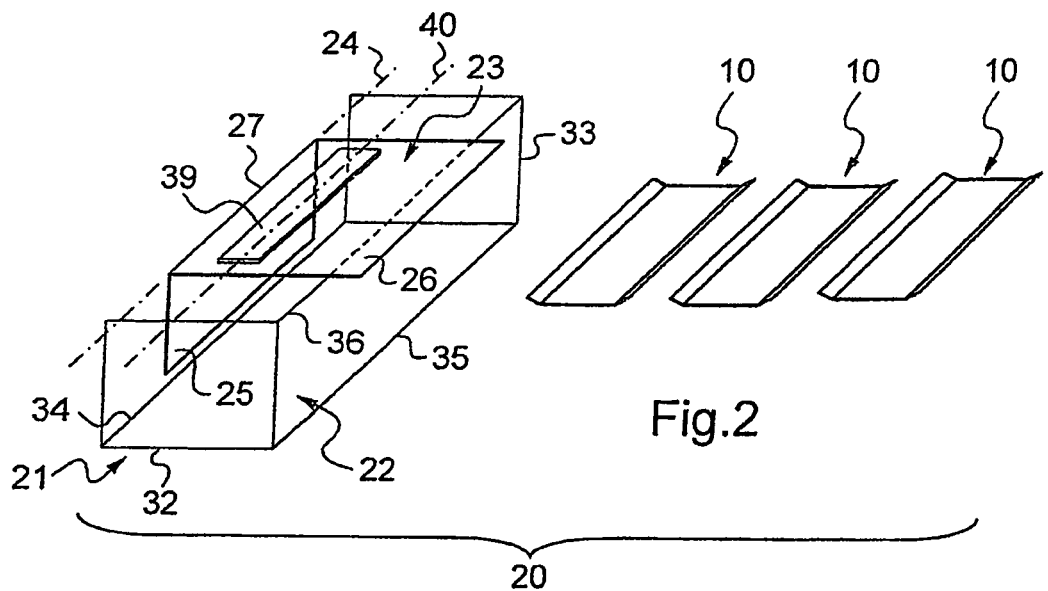
FIG. 2 is a diagrammatic perspective view of the essential components of a system of the invention.

With reference to FIG. 2 in particular, the sandwich preparation system 20 in accordance with the invention essentially comprises one or more batches of identical dishes 10 and a device 21 for titling a dish, which device is adapted to the dishes 10 so as to receive at least one of them and hold it during the transfer of a filling into a sandwich.

By way of example, the dishes are filled in advance and stored in a refrigerated container such that when a client orders a sandwich, it suffices to transfer the filling that has been ordered into a piece of bread or dough product selected by the client, using the device 21 as described below.

The device 21 comprises a base 22 on which a dish support 23 is mounted to pivot about a horizontal axis 24.

In the embodiment of FIGS. 2 to 5, the dish support is essentially constituted by two plane rectangular panels 25 and 26 interconnected at 27 via respective ones of their longitudinal edges, substantially along the pivot axis 24 so as to form a right angle.

The dish support also comprises two stub axles 28, 29 in alignment on the axis 24; the stub axles are secured to the panels 25 and 26 and they are engaged in two respective bearings 30 and 31 provided in the base so as to enable the support 23 to pivot relative to the base 22.

In FIG. 2, the base 22 is shown diagrammatically in the form of a mesh of thin bars forming two vertical rectangular frames 32 and 33 interconnected by three horizontal bars 34 to 36 extending parallel to the axis 24.

Figure 3:
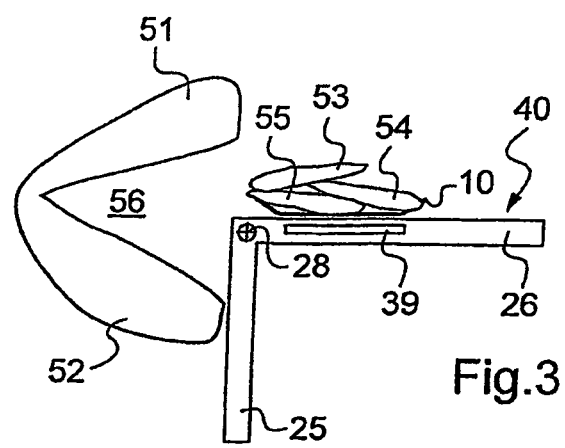
FIGS. 3 to 6 are diagrams showing successive operations in a method of the invention.

In the configuration shown in FIGS. 2 and 3, the dish support panel extends substantially horizontally, resting on the top bar 36 of the base 22 (see FIG. 2).

The panel 26 serves to receive a dish with filling, while the panel 25 serves as a pusher for causing the pivoting assembly to tilt about the axis 24 when a suitable force is exerted on the panel 25.

Figure 7:
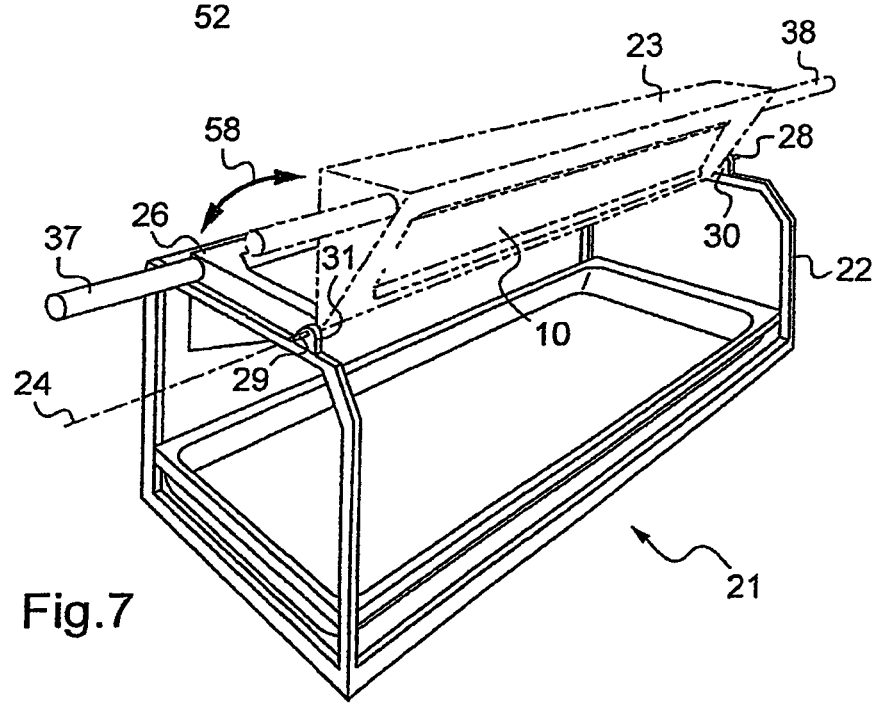
FIG. 7 is a diagrammatic perspective view of a device of the invention, shown in an imaginary configuration corresponding to both of two successive stages in the tilting of a filling support.

In the variant shown in FIG. 7, the tilting dish support has two handles 37 and 38 in alignment on an axis parallel to the axis 24, projecting from opposite ends of the support panel 26. It should be observed that this figure is a view that is "imaginary" in that it shows two titling assemblies in two distinct configurations, even though the device has only one dish support capable of tilting about the axis 24, this presentation serving to avoid an additional figure.

Figure 4:
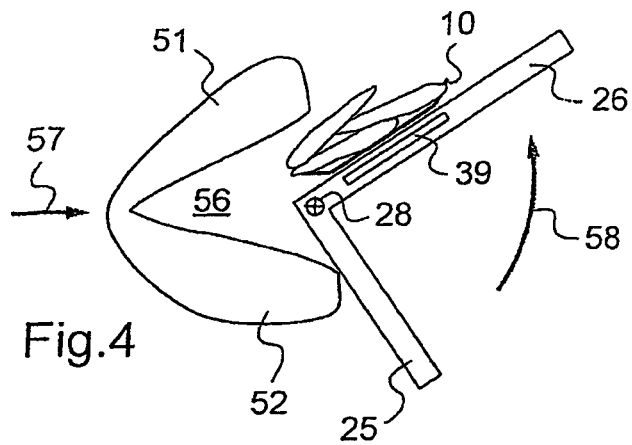
Figure 5:
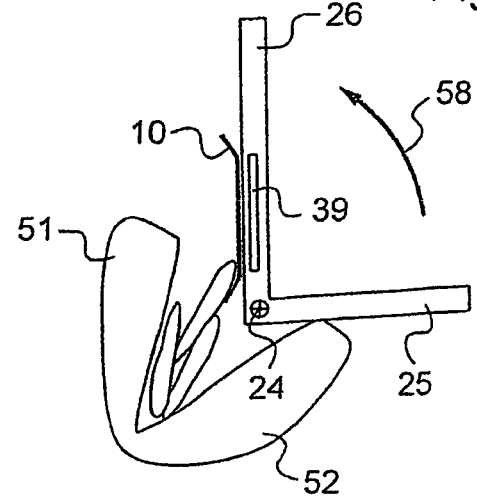
Figure 6:
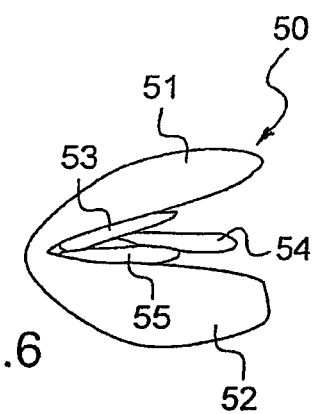

In order to retain the dish 10 on the panel 26 of the dish support when said panel is steeply tilted relative to the horizontal, e.g. as shown in FIGS. 4 and 5, the panel 26 is provided with magnetic dish-retaining means.

These retaining means are constituted essentially by a magnetized strip or bar 39 extending along a horizontal axis 40 parallel to the axis 24.

The position, the shape, the dimensions, the material, and the magnetization of the strip/bar 39 are selected and designed to exert sufficient traction force on the dish 10 while the dish is placed on the panel 26 to ensure that it does not slide and drop off when the panel 26 and the dish with filling it supports are deeply tilted, in particular into a substantially vertical position as shown in FIG. 5.

The magnetized strip/bar may be substantially flush with the top face 40 of the panel 26, or it may extend beneath said face, as shown in FIGS. 3 to 5.

With reference to FIGS. 3 to 6 in particular, in a method of preparing a sandwich 50 by inserting a filling made up of pieces 53, 54, and 55 that are stacked between two mutually facing portions 51 and 52 of a piece of bread (cf. FIG. 6), the following operations are performed in succession:

placing the filling 53 to 55 on a flat or dish 10 acting as a temporary support for the filling; placing the dish 10 with the filling on the tilting dish support panel 26, and engaging top and bottom portions 51 and 52 of the piece of bread on either side of the dish support pivot axis 24, substantially above and below said axis, the dish with filling, and the dish support, the bottom portion 52 coming into contact with the pusher-forming panel 25 and extending downwards below the axis 24 (cf. FIG. 3); and then actuating the pusher 25 by pushing it manually—in the direction of arrow 57—via the piece of bread 52; this causes the dish support to tilt (arrow 58, FIGS. 4 to 6) together with the dish and its filling towards the space 56 that is to be filled as defined by the top and bottom portions of the piece of bread or dough product, until the dish reaches an angle of inclination (cf. FIG. 5) suitable for causing the filling to slide off the dish 10 into the space for filling, while retaining the dish on the dish support panel 26.

Depending on the nature of the ingredients of the filling, on the nature of the dish 10, and on the way they adhere to each other as a result, the angle of inclination of the dish relative to the initial horizontal position that is required for transferring the filling by allowing the ingredients to drop may reach or exceed 45° or 90°, e.g. it may be situated in a range extending from about 90° to about 180°.

In the variant of FIG. 7, the dish 10 is caused to tilt by acting manually on the handles 37 and 38.

The invention claimed is:

1. A device for filling sandwiches, the device comprising;
   a base;
   a dish support arranged to receive a dish carrying a filling, the dish support being pivotally mounted on the base to pivot between a substantially horizontal position and an inclined position; and
   a pusher or a handle secured to the pivotally mounted dish support;
   the dish support including retaining means for retaining the dish on the dish support when the dish support is tilted, the retaining means acting by a magnetic effect.

2. A device according to claim 1, in which the dish support is mounted to pivot relative to the base about an axis that is substantially horizontal.

3. A device according to claim 1, in which the retaining means comprises a magnet arranged to attract the dish and the dish support toward each other when the dish is placed on the dish support.

4. A device according to claim 3, in which the magnet extends substantially parallel to the pivot axis of the dish support and is secured to the dish support.

5. A device for filling sandwiches, the device comprising:
   a base;
   a dish support arranged to receive a dish carrying a filling, the dish support being pivotally mounted on the base to pivot about a pivot axis between a substantially horizontal position and an inclined position; and
   a pusher or a handle secured to the pivotally mounted dish support;
   the dish support including retaining means for retaining the dish on the dish support by magnetic effect when the dish support is tilted; and the dish support comprising two portions extending substantially along two planes forming a dihedral angle and secured to each other substantially along the pivot axis.

6. A system for preparing a sandwich, the system including:
a device comprising a base, a dish support arranged to receive a dish carrying a filling and pivotally mounted on the base to pivot between a substantially horizontal position and an inclined position, and a pusher or a handle secured to the pivotally mounted dish support, the dish support including retaining means for retaining the dish on the dish support when the dish support is tilted; and
a plurality of identical filling supporting dishes, each filling supporting dish comprising an elongate base extended by two rims.

7. A system according to claim 6, wherein a face of each filling supporting dish is covered in a material for encouraging the filling to slide.

8. A system according to claim 6, in which the material for encouraging the filling to slide is polytetrafluoroethylene.

9. A system according to claim 6, in which the elongate base of the dishes is made of a magnetic material.

10. A system according to claim 9, in which the magnetic material is a ferritic stainless steel.

11. A device according to claim 5, further comprising means for mounting the dish support to pivot relative to the base about the pivot axis.

12. A device according to claim 5, in which the retaining means comprises a magnet arranged to attract the dish and the dish support toward each other when the dish is placed on the dish support.

13. A device according to claim 12, in which the magnet extends substantially parallel to the pivot axis of the dish support and is secured to the dish support.

14. A system according to claim 6, in which the retaining means act by a magnetic effect.

15. A system according to claim 6, in which the dish support is mounted to pivot relative to the base about an axis that is substantially horizontal.

16. A system according to claim 6, in which the retaining means comprises a magnet arranged to attract the dish and the dish support toward each other when the dish is placed on the dish support.

17. A system according to claim 16, in which the magnet extends substantially parallel to the pivot axis of the dish support and is secured to the dish support.

* * * * *